US011829778B2

(12) United States Patent  
Pareek et al.

(10) Patent No.: US 11,829,778 B2  
(45) Date of Patent: Nov. 28, 2023

(54) METHOD FOR ENHANCING PERFORMANCE OF ELECTRONIC DEVICE

(71) Applicant: Samsung Electronics Co., Ltd., Suwon-si (KR)

(72) Inventors: Saurabh Pareek, Rajasthan (IN); Pioush Kumar, Punjab (IN); Ved Gangwar, Uttar Pradesh (IN); Gaurav Yadav, Haryana (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 17/339,859

(22) Filed: Jun. 4, 2021

(65) Prior Publication Data

US 2021/0382730 A1    Dec. 9, 2021

(30) Foreign Application Priority Data

Jun. 4, 2020  (IN) .............................. 202041023551

(51) Int. Cl.
    *G06F 9/445*        (2018.01)  
    *G06F 9/54*          (2006.01)  
    (Continued)

(52) U.S. Cl.
CPC ............ *G06F 9/44505* (2013.01); *G06F 9/54* (2013.01); *G06N 5/04* (2013.01); *H04B 1/3827* (2013.01)

(58) Field of Classification Search
CPC ......... G06F 9/44505; G06F 9/54; G06N 5/04; H04B 1/3827

(Continued)

(56) References Cited

U.S. PATENT DOCUMENTS 5,396,635 A * 3/1995 Fung .................... G06F 1/3203  
                                          713/323  
5,606,243 A * 2/1997 Sakai .................. G01R 31/3648  
                                          320/152

(Continued)

FOREIGN PATENT DOCUMENTS

CN         108805276 B     9/2020  
KR      10-0981128 B1     9/2010

(Continued)

OTHER PUBLICATIONS

International Search Report and Written Opinion of the International Searching Authority dated Sep. 10, 2021 in connection with International Application No. PCT/KR2021/006984, 9 pages.

(Continued)

*Primary Examiner* — Paul R. Myers

(57) ABSTRACT

Embodiments herein disclose a method for enhancing a performance of an electronic device. The method includes detecting a plurality of hardware features of the electronic device. Further, the method includes learning a usage pattern of each of the hardware features of the electronic device over a period of time using a machine learning model. Further, the method includes predicting at least one of a remaining usage time of a battery of the electronic device and at least one application to be launched by a user of the electronic device based on the usage pattern of each of the hardware features. Further, the method includes enhancing the performance of the electronic device based on at least one of the predicted remaining usage time of the battery and the at least one predicted application to be launched by the user.

18 Claims, 12 Drawing Sheets

(51) Int. Cl.
*G06N 5/04* (2023.01)
*H04B 1/3827* (2015.01)

(58) Field of Classification Search
USPC .......................................... 713/100, 300–340
See application file for complete search history.

(56) References Cited

U.S. PATENT DOCUMENTS

| | | | | |
|---|---|---|---|---|
| 8,095,679 | B1* | 1/2012 | Satish | G06F 9/44521 |
| | | | | 709/213 |
| 8,204,552 | B2 | 6/2012 | Hong et al. | |
| 8,310,967 | B1* | 11/2012 | Goel | H04W 52/0206 |
| | | | | 370/311 |
| 8,813,080 | B2* | 8/2014 | Fenger | G06F 9/4893 |
| | | | | 718/107 |
| 9,160,037 | B2 | 10/2015 | Park | |
| 9,549,374 | B2 | 1/2017 | Lim et al. | |
| 10,459,887 | B1* | 10/2019 | Dvortsov | G06F 3/0362 |
| 11,507,877 | B2* | 11/2022 | Vadella | G06N 20/00 |
| 2004/0216112 | A1* | 10/2004 | Accapadi | G06F 9/4881 |
| | | | | 718/103 |
| 2005/0273636 | A1* | 12/2005 | Grobman | G06F 1/3203 |
| | | | | 714/E11.197 |
| 2008/0005332 | A1* | 1/2008 | Pande | G06F 9/4843 |
| | | | | 709/226 |
| 2008/0008492 | A1* | 1/2008 | Meetze | G03G 15/00 |
| | | | | 399/88 |
| 2010/0123436 | A1 | 5/2010 | Herrod et al. | |
| 2012/0005490 | A1 | 1/2012 | Goraczko et al. | |
| 2012/0047379 | A1* | 2/2012 | Chen | G06F 1/26 |
| | | | | 713/320 |
| 2012/0256588 | A1* | 10/2012 | Hayashi | H02J 7/00047 |
| | | | | 320/109 |
| 2012/0317432 | A1 | 12/2012 | Assad et al. | |
| 2012/0326724 | A1* | 12/2012 | Park | G01R 31/3648 |
| | | | | 324/426 |
| 2013/0107727 | A1* | 5/2013 | Lunden | H04W 52/0216 |
| | | | | 370/252 |
| 2013/0283283 | A1* | 10/2013 | Wang | H04M 1/67 |
| | | | | 718/102 |
| 2014/0082383 | A1 | 3/2014 | De Cesare et al. | |
| 2014/0108778 | A1* | 4/2014 | Molloy | G06F 9/223 |
| | | | | 713/100 |
| 2014/0143791 | A1* | 5/2014 | Mark | G06F 9/485 |
| | | | | 719/318 |
| 2015/0046109 | A1* | 2/2015 | Miwa | H01M 10/482 |
| | | | | 702/63 |
| 2015/0142964 | A1* | 5/2015 | Oki | H04L 43/0829 |
| | | | | 709/224 |
| 2015/0198676 | A1* | 7/2015 | Min | H02J 50/12 |
| | | | | 320/114 |
| 2015/0310335 | A1* | 10/2015 | Fan | G06F 30/20 |
| | | | | 706/46 |
| 2016/0019460 | A1* | 1/2016 | Li | G06F 16/24578 |
| | | | | 719/318 |
| 2016/0041231 | A1* | 2/2016 | Lee | G01R 31/367 |
| | | | | 702/63 |
| 2016/0157180 | A1 | 6/2016 | Brown et al. | |
| 2016/0261131 | A1* | 9/2016 | Childress | H02J 7/0069 |
| 2018/0268383 | A1 | 9/2018 | Kim et al. | |
| 2018/0314972 | A1* | 11/2018 | Swindell | G06N 20/00 |
| 2019/0138325 | A1* | 5/2019 | Chen | G06N 7/00 |
| 2019/0181659 | A1* | 6/2019 | Kim | H02J 7/00306 |
| 2019/0278627 | A1* | 9/2019 | Kapinos | G06N 5/04 |
| 2020/0303938 | A1* | 9/2020 | Owen | H01M 10/44 |
| 2020/0309857 | A1* | 10/2020 | Zeyghami | H02J 7/0068 |
| 2020/0401428 | A1* | 12/2020 | Soman | G06F 9/45558 |
| 2021/0073008 | A1 | 3/2021 | Park et al. | |

FOREIGN PATENT DOCUMENTS

| | | |
|---|---|---|
| KR | 10-2012-0079808 A | 7/2012 |
| KR | 10-1762520 B1 | 7/2017 |
| KR | 10-2018-0105464 A | 9/2018 |
| KR | 10-1945117 B1 | 2/2019 |
| KR | 10-2019-0109339 A | 9/2019 |
| KR | 10-2020-0014510 A | 2/2020 |
| WO | 2015/147715 A1 | 10/2015 |

OTHER PUBLICATIONS

Intellectual Property India, "Examination report under sections 12 & 13 of the Patents Act" dated Dec. 21, 2021, in connection with Indian Patent Application No. 202041023551, 7 pages.

* cited by examiner

METHOD FOR ENHANCING PERFORMANCE OF ELECTRONIC DEVICE

CROSS-REFERENCE TO RELATED APPLICATIONS

This application is based on and claims priority under 35 U.S.C. § 119 to Indian Patent Application No. 202041023551 filed on Jun. 4, 2020 in the Indian Patent Office, the disclosure of which is incorporated by reference herein in its entirety.

BACKGROUND

1. Field

The present disclosure relates to an electronic device, and more specifically related to a method for enhancing a performance of an electronic device.

2. Description of Related Art

In general, while rebooting an electronic device, lots of processes are created in the electronic device according to a boot complete broadcast, which acquire huge memories and create a load on a central processing unit (CPU) which leads to delay in an application launch and delay in other important ordered broadcasts in the electronic device.

Further, whenever a state of the electronic device reaches to a low memory state (i.e., low RAM state), the electronic device performs sluggishly and it takes more time to launch a heavy application (e.g., games application, on-demand video application or the like) so that the performance of the electronic device is deteriorated. Further, battery usage of the electronic device is not optimized as per user usage, due to which at some critical time the electronic device may turnoff, or more charging is required from a normal charging pattern.

SUMMARY

The principal object of the embodiments herein is to provide a method for enhancing a performance of an electronic device.

Accordingly, embodiments herein disclose a method for enhancing a performance of an electronic device. The method includes detecting, by the electronic device, a plurality of hardware features of the electronic device. Further, the method includes learning, by the electronic device, a usage pattern of each of the hardware features of the electronic device over a period of time using a machine learning model. Further, the method includes predicting, by the electronic device, at least one of a remaining usage time of a battery of the electronic device and at least one application to be launched by a user of the electronic device based on the usage pattern of each of the hardware features of the electronic device. Further, the method includes enhancing, by the electronic device, the performance of the electronic device based on at least one of the predicted remaining usage time of the battery and the at least one predicted application to be launched by the user.

In various embodiments, the plurality of hardware features incudes at least one of a memory, a network, a display, a speaker, a Global Positioning System (GPS), a Wireless Fidelity (Wi-Fi), a Bluetooth, a camera, a microphone, and a processor.

In various embodiments, enhancing, by the electronic device, the performance of the electronic device based on the remaining usage time of the battery includes predicting, by the electronic device, a next charging cycle of the battery, and optimizing, by the electronic device, a usage of the battery by automatically enabling at least one power saving mode in the electronic device based on the remaining usage time of the battery and the next charge cycle.

In various embodiments, optimizing the usage of the battery by automatically enabling a power saving mode in the electronic device based on the remaining usage time of the battery and the next charge cycle incudes determining, by the electronic device, whether the remaining usage time of the battery can power the electronic device until the next charge cycle, and optimizing, by the electronic device, the usage of the battery by automatically enabling a power saving mode in the electronic device in response to determining that the remaining usage time of the battery may not power the electronic device until the next charge cycle. The power saving mode enables the remaining usage time of the battery to power the electronic device until the next charge cycle.

In various embodiments, predicting, by the electronic device, the next charging cycle of the battery includes learning, by the electronic device, a charging pattern of the battery over a period of time using the machine learning model, and predicting, by the electronic device, the next charging cycle of the battery based on the learned charging pattern of the battery over the period of time.

In various embodiments, enhancing, by the electronic device, the performance of the electronic device based on the at least one predicted application to be launched by the user includes determining, by the electronic device, an amount of memory to be cleared for launching the at least one predicted application based on a plurality of memory parameters, selecting, by the electronic device, at least one least recently used (LRU) application from a plurality of currently running applications in the electronic device based on the amount of memory to be cleared for launching the at least one predicted application, clearing, by the electronic device, the at least one selected LRU application before launching the at least one predicted application, and launching, by the electronic device, the at least one predicted application.

In various embodiments, the at least one LRU application includes a least priority in compared to the other applications currently running in the electronic device.

In various embodiments, clearing, by the electronic device, the at least one selected LRU application before launching the at least one predicted application includes determining, by the electronic device, whether the at least one selected LRU application is a frequently used application by the user, preserving at least one process associated with the at least one selected LRU application in response to determining that the at least one selected LRU application is the frequently used application by the user, and clearing the at least one selected LRU application after preserving the process associated with the at least one selected LRU application, and clearing the at least one selected LRU application without preserving the process associated with the at least one selected LRU application in response to determining that the at least one selected LRU application is not the frequently used application by the user.

In various embodiments, the plurality of memory parameters comprise at least one of a number of free slot of the memory, a cumulative launch time of the at least one predicted application to be launched, the amount of memory to be cleared for launching the at least one predicted application, a current load of the electronic device, and an average launch time of the at least one predicted application to be launched for at least one free slot of the memory.

In various embodiments, determining whether the at least one selected LRU application is the frequently used application by the user is based on at least one of an alive duration of the at least one selected LRU application per hour, a duration of the at least one selected LRU application not visible on a display, a time difference between life cycles of the at least one selected LRU application, a time difference between pause event of the at least one selected LRU application and a resume event of the at least one selected LRU application, a number of time the at least one selected LRU application cleared and created in a specific duration, and a mean time of at least one selected LRU application life cycle creation.

In various embodiments, enhancing, by the electronic device, the performance of the electronic device based on the at least one predicted application to be launched by the user includes detecting, by the electronic device, a boot event, generating, by the electronic device, a plurality of broadcasts to be transmitted to a plurality of broadcast receivers in the electronic device, wherein each of the broadcast receiver is associated with at least one application in the electronic device, for each of the broadcasts, determining, by the electronic device, whether a number of receiver exceeds a receiver threshold, creating, by the electronic device, a first broadcast queue comprising a first broadcast having the number of receivers within the receiver threshold and a second broadcast queue comprising a second broadcast having the number of receivers that exceeds the receiver threshold, scheduling, by the electronic device, the first broadcasts of the first broadcast queue, and scheduling, by the electronic device, the second broadcast of the second broadcast queue after scheduling the first broadcast of the first broadcast queue.

In various embodiments, scheduling, by the electronic device, the second broadcast of the second broadcast queue comprises recomputing, by the electronic device, a priority of each receiver for the second broadcast, wherein the second broadcast comprises at least one receiver of the at least one predicted application to be launched by the user and the at least one receiver of at least one application to be launched by the electronic device, scheduling, by the electronic device, the broadcast of the at least one receiver of the at least one predicted application to be launched by the user, and scheduling, by the electronic device, the broadcast of the receivers of at least one application to be launched by the electronic device after scheduling of the at least one receiver of the at least one predicted application to be launched by the user.

In various embodiments, recomputing, by the electronic device, a priority of each receiver for the second broadcast comprises determining, by the electronic device, at least one process associated with each of the receivers, determining, by the electronic device, a plurality of parameters of the at least one process associated with each of the receivers, and recomputing, by the electronic device, a priority for each of the receivers based on the plurality of parameters of the at least one process associated with each of the receivers.

In various embodiments, the plurality of parameters of the at least one process associated with each of the receivers comprises at least one of an alive duration of the at least one process, a difference between a start time of the at least one process and a boot time of the electronic device, a weighting associated with the receivers of at least one application to be launched by the electronic device, a weighting associated with the at least one receiver of the at least one predicted application to be launched by the user, a kill time of the at least one process, a category of the at least one process, and a register receiver count of the at least one process.

According to an embodiment of the disclosure, there is provided a non-transitory computer-readable recording medium having recorded thereon a computer program that is executable by at least one processor to perform the method.

Accordingly embodiments herein disclose an electronic device for enhancing a performance of the electronic device. The electronic device includes a hardware feature-based performance enhancement engine coupled to a memory and a processor. The hardware feature-based performance enhancement engine is configured to detect a plurality of hardware features of the electronic device. Further, the hardware feature-based performance enhancement engine is configured to learn a usage pattern of each of the hardware feature of the electronic device over a period of time using a machine learning model. Further, the hardware feature-based performance enhancement engine is configured to predict at least one of a remaining usage time of a battery of the electronic device and at least one application to be launched by a user of the electronic device based on the usage pattern of each of the hardware feature of the electronic device. Further, the hardware feature-based performance enhancement engine is configured to enhance the performance of the electronic device based on at least one of the predicted remaining usage time of the battery and the at least one predicted application to be launched by the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
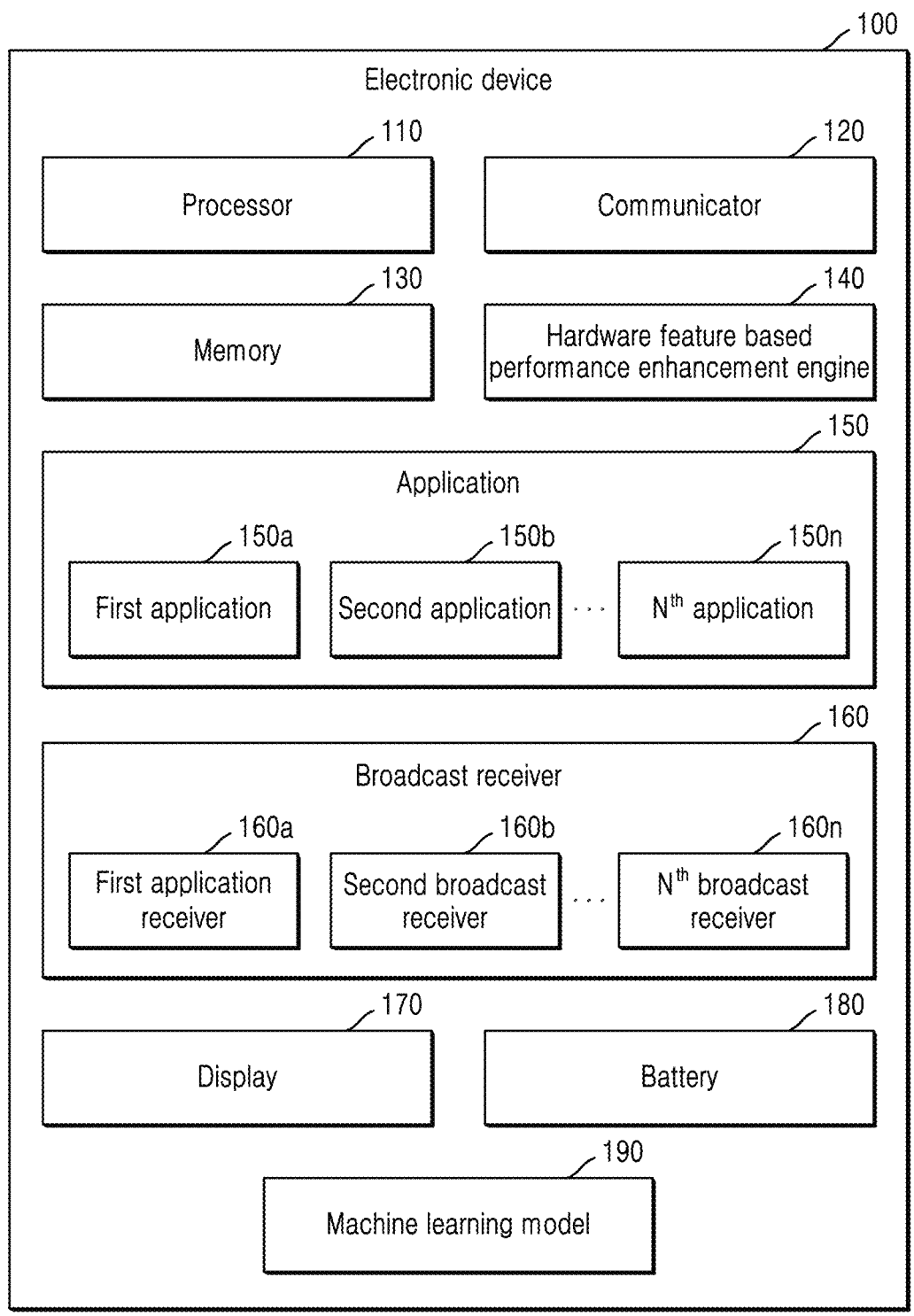
FIG. 1A shows various hardware components of an electronic device, according to an embodiment as disclosed herein.

FIGS. 1A through 3E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for enhancing a performance of an electronic device. The method includes detecting, by the electronic device, a plurality of hardware features of the electronic device. Further, the method includes learning, by the electronic device, a usage pattern of each of the hardware feature of the electronic device over a period of time using a machine learning model. Further, the method includes predicting, by the electronic device, at least one of a remaining usage time of a battery of the electronic device and at least one application to be launched by a user of the electronic device based on the usage pattern of each of the hardware feature of the electronic device. Further, the method includes enhancing, by the electronic device, the performance of the electronic device based on at least one of the predicted remaining usage time of the battery and the at least one predicted application to be launched by the user.

Unlike conventional methods and system, the proposed method can be used to prioritize all receivers based on user usage and reschedule non-prioritize broadcasts. This results in an application launch improvement in a low memory condition and quick boot up of the electronic device. The proposed method can be used to improve the battery management in the electronic device as different battery modes will be applied dynamically based on user usage and charging patterns. While launching the application, the proposed method can be used to clean required RAM in advance and preserve important data while cleaning.

Referring now to the drawings, and more particularly to FIGS. 1A through 3E, there are shown preferred embodiments.

FIG. 1A shows various hardware components of an electronic device 100, according to embodiments as disclosed herein. The electronic device 100 can be, for example, but not limited to a cellular phone, a smart phone, a personal digital assistant (PDA), a tablet computer, a laptop computer, an Internet of Things (IoT), a virtual reality device, or the like. The electronic device 100 includes a processor 110, a communicator 120, a memory 130, a hardware feature-based performance enhancement engine 140, a plurality of applications 150a-150n, a plurality of broadcast receivers 160a-160n, a display 170, a battery 180, and a machine learning model 190. Hereafter, the label of the plurality of applications is 150 and the label of the plurality of broadcast receivers is 160. The application 150 can be, for example, but not limited to a game application, a social networking application, a chat application, an on-line video application, a finance application, a video application or the like.

The processor 110 may be coupled with the communicator 120, the memory 130, the hardware feature-based performance enhancement engine 140, the applications 150, the plurality of broadcast receivers 160, the display 170, the battery 180, and the machine learning model 190.

In various embodiments, the hardware feature-based performance enhancement engine 140 may be configured to detect a plurality of hardware features of the electronic device 100. The plurality of hardware features can be, for example, but not limited to the memory 130, a network, the display 170, a speaker, a GPS, a Wi-Fi, a Bluetooth, a camera, a microphone, a network, and the processor 110. For example, the application prediction and the battery usage prediction are indicated in table 1 based on the hardware features.

TABLE 1

| Apps | App Prediction | | | Battery usage Prediction | | |
|---|---|---|---|---|---|---|
| | App 1 | App 2 | App N | Time 1 | Time 2 | Time N |
| Features used | | Usage | | | Usage | |
| RAM Usage | R1 | R2 | R3 | R1 | R2 | R3 |
| Network Usage | N1 | N2 | N3 | N1 | N2 | N3 |
| Display level | | X | | D11 | D12 | D13 |
| Speaker (On/Off) | S1 | S2 | S3 | S1 | S2 | S3 |
| Speaker loudness | | X | | S11 | S12 | S13 |
| Temperature | T1 | T2 | T3 | T1 | T2 | T3 |
| GPS (On/Off) | | X | | GPS1 | GPS2 | GPS3 |
| Wi-Fi (On/Off) | | X | | WF1 | WF2 | WF3 |
| Bluetooth (On/Off) | | X | | B11 | B12 | B13 |
| Camera | C1 | C2 | C3 | C1 | C2 | C3 |
| Microphone | M1 | M2 | M3 | M1 | M2 | M3 |
| On Call | CA1 | CA2 | CA3 | CA1 | CA2 | CA3 |
| Network Type (3G, 4G, 5G) | | X | | NT1 | NT2 | NT3 |
| CPU Usage | CPU1 | CPU2 | CPU3 | CPU1 | CPU2 | CPU3 |
| Broadcast Sent | B1 | B2 | B3 | | X | |
| GPU Usage | GP1 | GP2 | GP3 | GP1 | GP2 | GP3 |

Further, the hardware feature-based performance enhancement engine 140 may be configured to learn a usage pattern of each of the hardware feature of the electronic device 100 over a period of time using the machine learning model 190. The hardware feature-based performance enhancement engine 140 configured to learn the usage pattern of each of the hardware feature of the electronic device 100 over the period of time using the machine learning model 190 according to an embodiment is depicted in the FIG. 3A.

In various embodiments, the hardware feature-based performance enhancement engine 140 may be configured to learn a charging pattern of the battery 180 over a period of time using the machine learning model 190. Further, the hardware feature-based performance enhancement engine 140 may be configured to predict the next charging cycle of the battery 180 based on the learned charging pattern of the battery over the period of time.

Consider the below example for predicting the usage of every feature until a next charging time. The hardware feature is a display brightness level, and time to charge is 1 hour, so the electronic device 100 will predict the display brightness level for the next hour. The electronic device 100 knows the battery 180 consumed by the display at all brightness levels, so the electronic device 100 can simply find the battery consumed by the display in the next hour by multiplying the display battery usage by the time it is being used for. By adding up battery usage for every feature, the electronic device 100 can calculate the cumulative battery usage for the next hour.

Based on the usage pattern of each of the hardware features of the electronic device 100, the hardware feature-based performance enhancement engine 140 may be configured to predict at least one of a remaining usage time of the battery 180 of the electronic device 100 and at least one application to be launched by a user of the electronic device 100.

In various embodiments, the hardware feature-based performance enhancement engine 140 may be configured to predict a next charging cycle of the battery 180. Further, the hardware feature-based performance enhancement engine 140 may be configured to optimize the usage of the battery by automatically enabling at least one power saving mode in the electronic device based on the remaining usage time of the battery and the next charge cycle. The hardware feature-based performance enhancement engine 140 may be configured to determine whether the remaining usage time of the battery 180 can power the electronic device 100 until the next charge cycle. In response to determining that the remaining usage time of the battery 180 may not power the electronic device 100 until the next charge cycle, the hardware feature-based performance enhancement engine 140 may be configured to optimize the usage of the battery 180 by automatically enabling a power saving mode in the electronic device 100. The power saving mode may enable the remaining usage time of the battery 180 to power the electronic device 100 until the next charge cycle. The hardware feature-based performance enhancement engine 140 may be configured to enhance the performance of the electronic device 100 based on the remaining usage time of the battery 180.

For example, the predicted battery usage is computed based on the below equation (1).

$$P_{bu} = (\Sigma_{i=1}^{n} T_i \times F_i) \tag{1}$$

Wherein, n represents a number of features, T represents a time, F represents feature-wise battery usage, and $P_{bu}$ represents a predicted battery usage.

Figure 3A:
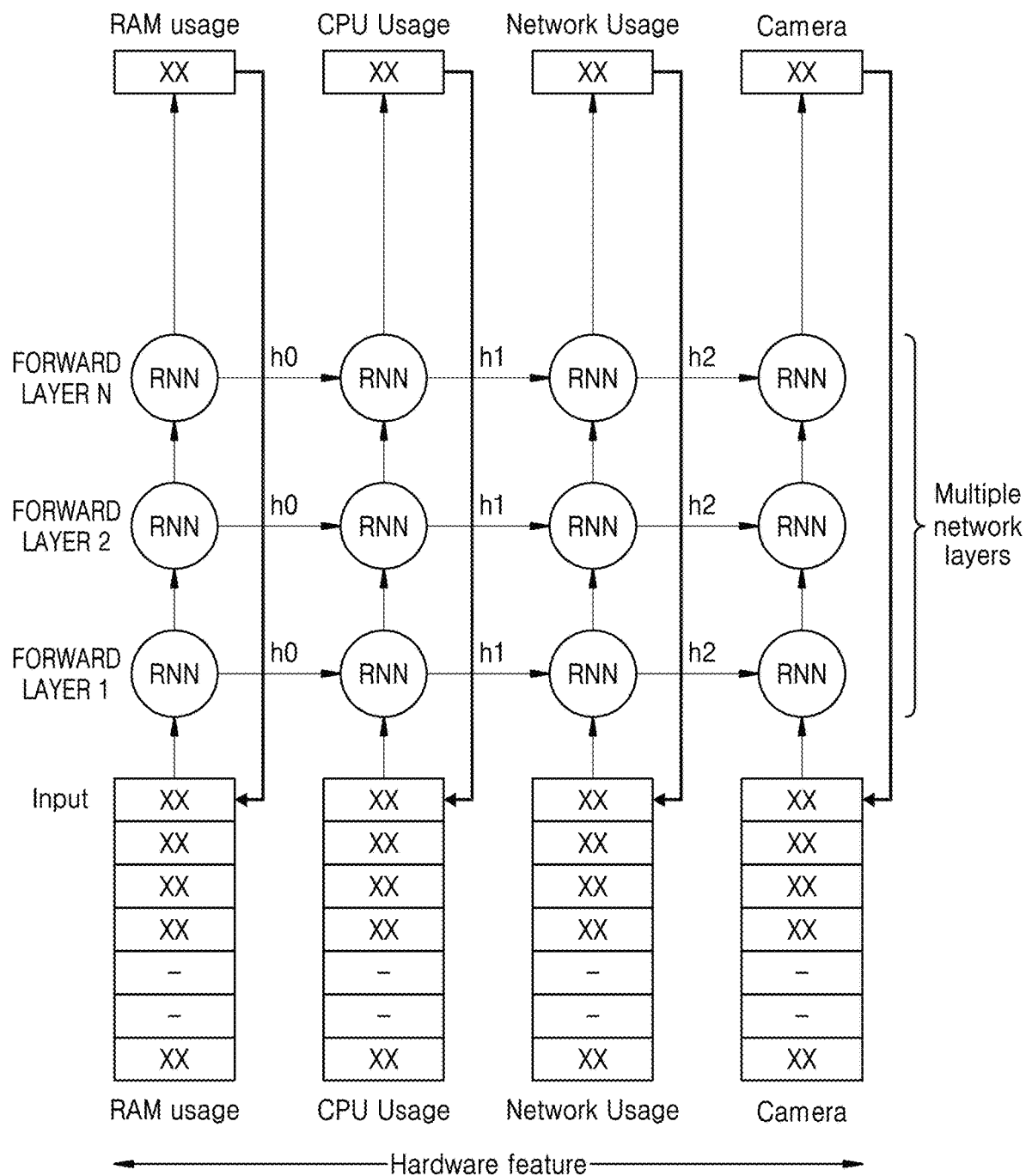
FIG. 3A is an example scenario in which the hardware feature-based performance enhancement engine learns the usage pattern of each of a hardware feature of the electronic device over a period of time using a machine learning model, according to an embodiment as disclosed herein.
Figure 3B:
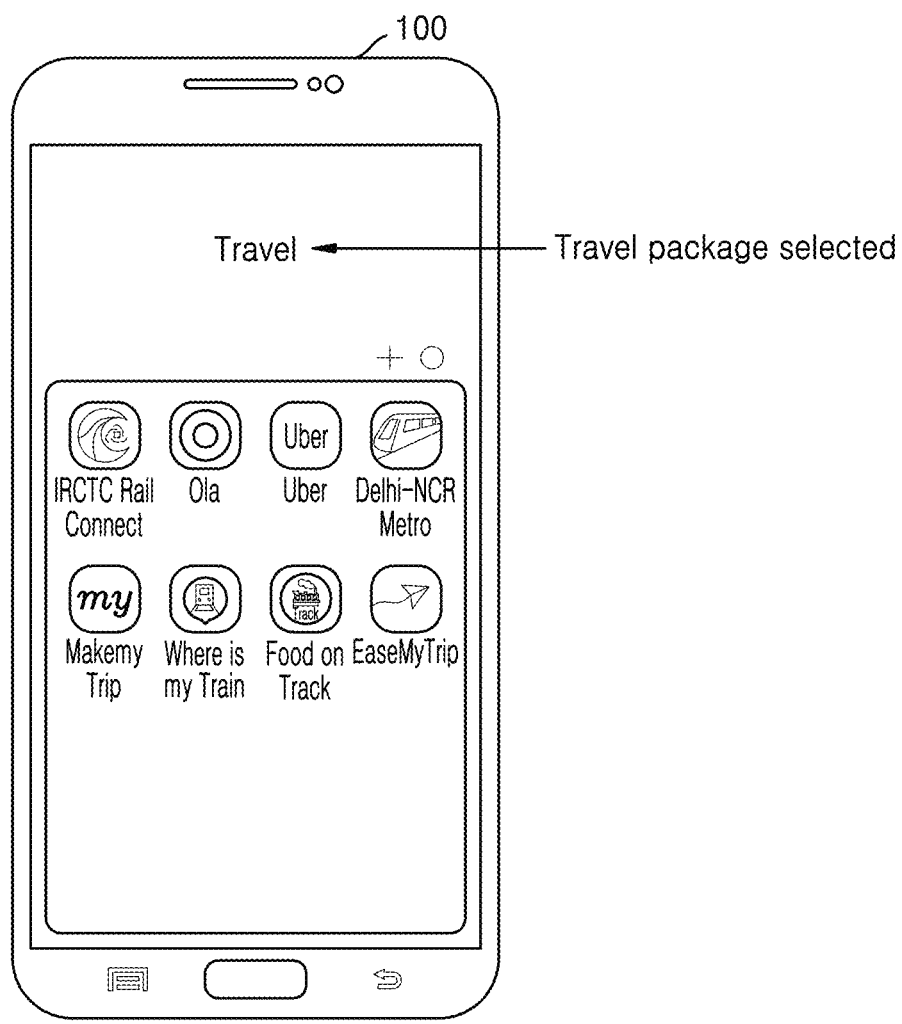
FIG. 3B is an example scenario in which applications are filtered using information about application package, according to an embodiment as disclosed herein.
Figure 3C:
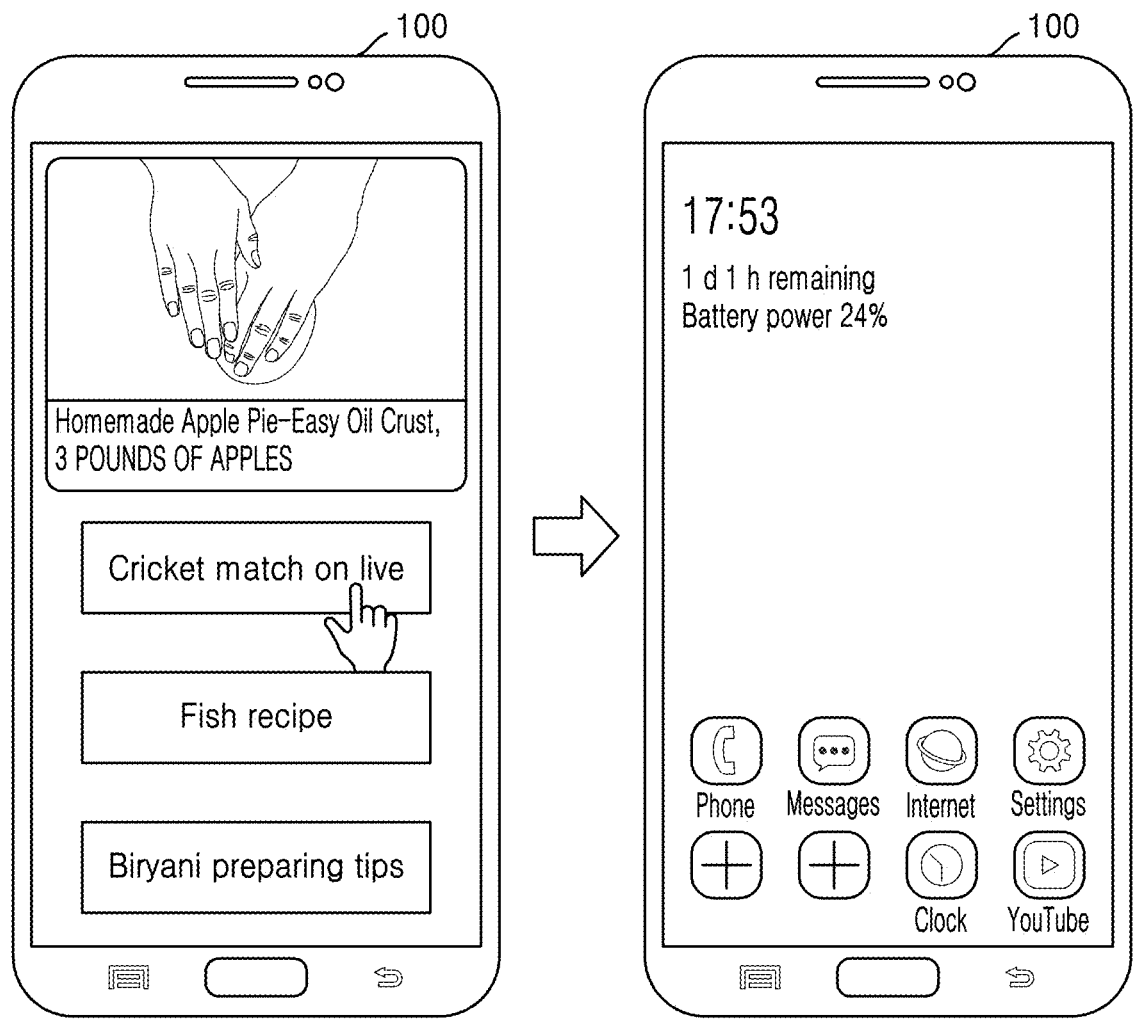
FIG. 3C is an example scenario in which electronic device automatically enables a power saving mode based on a remaining usage time of a battery, according to an embodiment as disclosed herein.

For example, as shown in the FIG. 3C, consider, the user of the electronic device 100 watches a cooking video in a social networking application as shown on the left side of the FIG. 3C. Further, the user wishes to watch the cricket match live in a sports application. In that scenario, electronic device 100 knows that user charges the battery 180 in the morning at 8:00 AM and usually, the user next charging pattern will be at 9:00 PM. Based on the user charging pattern, the electronic device 100 determines whether the remaining usage time of the battery 180 can power the electronic device 100 until the next charge cycle. If the remaining usage time of the battery may not power the electronic device 100 until the next charge cycle, the electronic device 100 automatically enables the power saving mode to optimize the usage of the battery 180 as shown on the right side of the FIG. 3C.

In various embodiments, the hardware feature-based performance enhancement engine 140 may be configured to predict the at least one application to be launched by the user and determine an amount of memory 130 to be cleared for launching the at least one predicted application based on a plurality of memory parameters. In predicting the at least one application to be launched, applications may be filtered using information about application package selected by the user as shown in the FIG. 3B. By filtering applications, prediction speed and accuracy may be improved. In various embodiments, the hardware feature-based performance enhancement engine 140 may be configured to collect application package information and predict the at least one application to be launched by the user based on the application package information. The plurality of memory parameters can be, for example, but not limited to a number of free slots of the memory 130, a cumulative launch time of the at least one predicted application to be launched, the amount of memory to be cleared for launching the at least one predicted application, a current load of the electronic device 100, and an average launch time of the at least one predicted application to be launched for at least one free slot of the memory 130.

For example, the hardware feature-based performance enhancement engine 140 may be configured to predict the at least one application to be launched by the user and determine an amount of memory 130 to be cleared for launching the at least one predicted application based on the plurality of memory parameters using below equation (2).

$$R = K\left(\frac{\sqrt{T_{AR}} - \sqrt{T_C}}{\sqrt{T_{AR}}}\right) \tag{2}$$

Wherein AR represents an available free RAM slot, $T_C$ represents a cumulative app launch time, $T_{AR}$ represents an app launch time for a specific available RAM slot, K represents an available RAM for a best opening average, and R represents a required RAM to be cleared.

For example, application launch prediction score may be calculated based on the below equation (3).

$$ApValue_x = \text{Tanh}\left(\sum_{k=1}^{n} \frac{1}{c_i} \times \frac{1}{s_i}\right) \tag{3}$$

Wherein the n represents a number of features, $S_i$ represents a feature similarity score (Predicted—memory values), $C_i$ represents a coefficient for each feature, and Score represents an app prediction Score. The $S_i$ is obtained by a predicted usage of every feature and calculated difference from the usual usage for that feature for all the applications. $C_i$ is obtained by every feature affecting the application launch prediction in a different ratio. $S_i$s are multiplied by different coefficients. After observing the dependency of prediction score on every feature, a coefficient is assigned to every feature.

For example, an application launch prediction score is calculated using table 2.

TABLE 2

| Apps<br>Features used | DB Values<br>App 1<br>Usage | Predicted values<br>RNN<br>Predicted Usage | $S_i$ | Ci |
| --- | --- | --- | --- | --- |
| RAM Usage | R1 | pR | S1 | 0.21 |
| Network Usage | N1 | pN | S2 | 0.12 |
| Display level | X | X | X | X |
| Speaker (On/Off) | S1 | pS | S3 | 0.06 |
| Speaker loudness | X | X | X | X |
| Temperature | X | X | X | X |
| GPS (On/Off) | X | X | X | X |
| Wi-Fi (On/Off) | X | X | X | X |
| Bluetooth (On/Off) | X | X | X | X |
| Camera | C1 | pC | S5 | 0.1 |
| Microphone | M1 | pM | S6 | 0.04 |
| On Call | CA1 | pCA | S7 | 0.07 |
| Network Type (3G, 4G, 5G) | X | X | X | X |
| CPU Usage | CU1 | pCU | S8 | 0.18 |
| Broadcast Sent | B1 | pB | S9 | 0.05 |
| GPU Usage | GP1 | pGP | S10 | 0.17 |

Further, the hardware feature-based performance enhancement engine 140 may be configured to select at least one least recently used (LRU) application from the plurality of currently running applications 150 in the electronic device 100 based on the amount of memory 130 to be cleared for launching the at least one predicted application.

In various embodiments, the at least one LRU application may comprise a least priority in compared to the other applications currently running in the electronic device 100.

For example, the user of the electronic device 100 wants to lunch a body building exercise related application, but the user of the electronic device 100 currently using a game application, a video application, and a finance-related application. The game application, video application, and the finance-related application consume 400 MB of RAM and the electronic device 100 has only 500 MB of RAM for the user. In this scenario, if the electronic device 100 wants 200 MB of RAM for launching the body building exercise related application, then, based on the proposed methods, the electronic device 100 checks the least priority application and releases the memory of the least priority application. In this scenario, if the least priority application will be the finance-related application, the electronic device 100 releases the memory of the finance-related application. After releasing the memory of the finance-related application, the electronic device 100 checks if the memory is sufficient for lunching the body building exercise related application. If the memory is not sufficient, the electronic device 100 releases the next least memory application and launches the body building exercise related application.

Further, the hardware feature-based performance enhancement engine 140 may be configured to clear the at least one selected LRU application before launching the at least one predicted application.

Figure 3D:
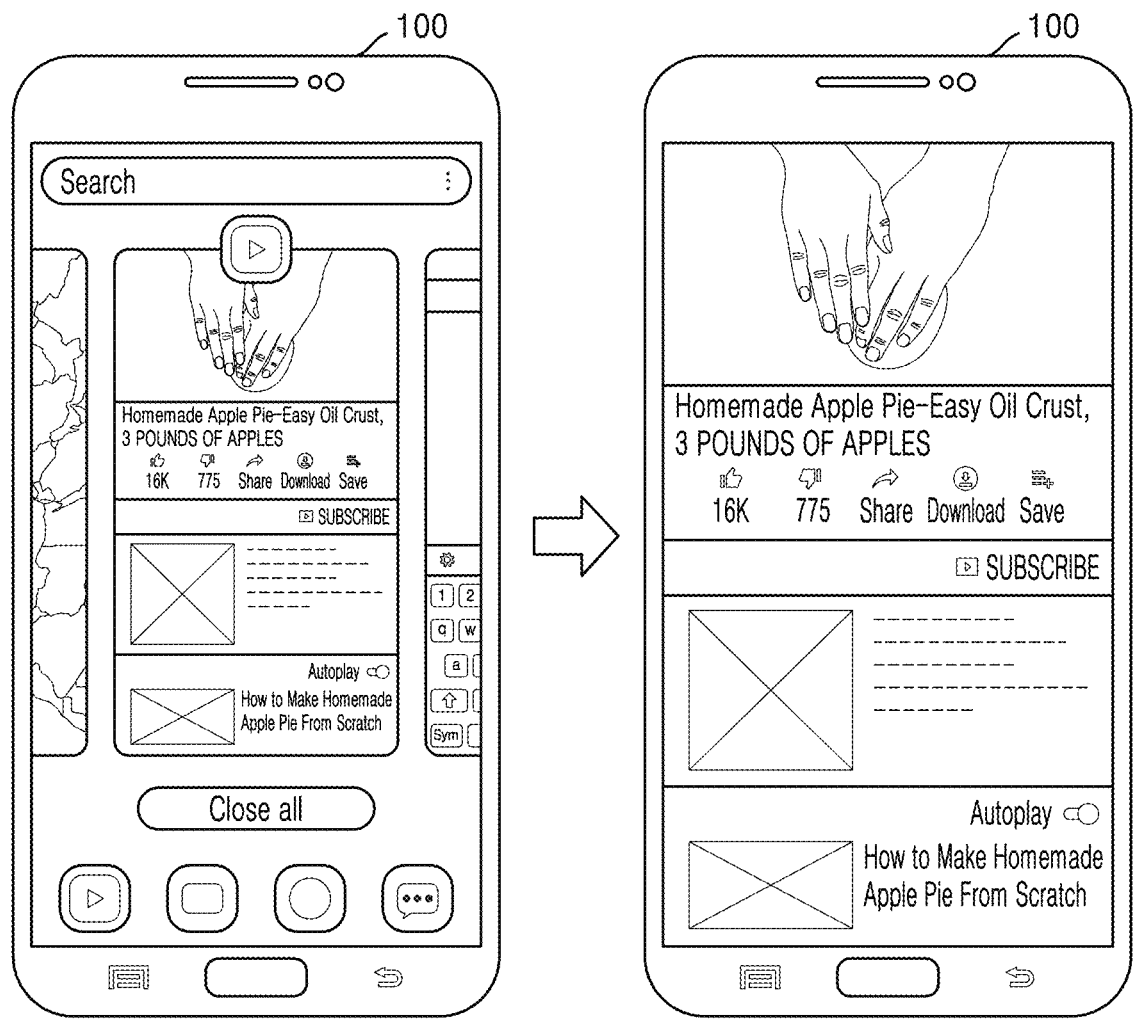
FIG. 3D is an example scenario in which the electronic device opens an application, used by the user frequently, quickly by preserving at least one process of the application, according to an embodiment as disclosed herein.

In various embodiments, the hardware feature-based performance enhancement engine 140 may be configured to detect at least one input to clear all LRU applications. In various embodiments, the hardware feature-based performance enhancement engine 140 may be configured to determine whether the at least one selected LRU application is a frequently used application by the user. In response to determining that the at least one selected LRU application is the frequently used application by the user, the hardware feature-based performance enhancement engine 140 may be configured to preserve at least one process associated with the at least one selected LRU application. Further, the hardware feature-based performance enhancement engine 140 may be configured to clear the at least one selected LRU application after preserving the process associated with the at least one selected LRU application. For example, as shown in FIG. 3D, if the electronic device 100 preserves the process associated with the at least one selected LRU application, then, while opening the next time, the electronic device 100 quickly launches the application. This improves the performance of the electronic device 100.

In response to determining that the at least one selected LRU application is not frequently used application by the user, the hardware feature-based performance enhancement engine 140 may be configured to clear the at least one selected LRU application and launch the at least one predicted application without preserving the process associated with the at least one selected LRU application.

Further, the hardware feature-based performance enhancement engine 140 may be configured to launch the at least one predicted application and enhance the performance of the electronic device 100 based on the at least one predicted application to be launched by the user.

In various embodiments, the at least one process associated with the at least one selected LRU application is preserved based on at least one of an alive duration of the at least one selected LRU application per hour, a duration of the at least one selected LRU application not visible on a display 170, a time difference between life cycles of the at least one selected LRU application, a time difference between pause event of the at least one selected LRU application and a resume event of the at least one selected LRU application, a number of times that the at least one selected LRU application is cleared and created in a specific duration, and a mean time of at least one selected LRU application life cycle creation.

For example, a preserve process while killing an application is computed based on the below equation (4 and 5).

$$P = \frac{(x-y)^2}{T} \quad (4)$$

$$T = \frac{1}{N}(t_1 + t_2 + t_3 \ldots + t_N) = \frac{1}{N}\sum_{i=1}^{N} t_i \quad (5)$$

Wherein x represents an app alive duration per hour, y represents a duration of an app not visible on a screen, t represents a time between an app life cycle (kill to create), $T_i$ represents a time between apps pausing and resuming (other app comes to top), N represents a number of time an app is killed and created in a specific duration, and T represents a mean time of an app's life cycle creation.

For example, the electronic device 100 quickly launches the application (e.g., body building application) based on the user preference.

In various embodiments, the hardware feature-based performance enhancement engine 140 may be configured to detect a boot event and generate a plurality of broadcasts to be transmitted to a plurality of broadcast receivers 160 in the electronic device 100. Each of the broadcast receivers is associated with at least one application in the electronic device 100. A broadcast receiver is a system component that allows the electronic device 100 to send or receive system events or application events. For example, applications can register for various system events like a boot complete or low battery, and an Android system sends a broadcast when a specific event occurs.

Further, the hardware feature-based performance enhancement engine 140 may be configured to determine whether a number of receivers exceeds a receiver threshold for each of the broadcasts. Further, the hardware feature-based performance enhancement engine 140 may be configured to create a first broadcast queue comprising a first broadcast having a number of receivers within the receiver threshold and a second broadcast queue comprising a second broadcast having a number of receivers that exceeds the receiver threshold. Further, the hardware feature-based performance enhancement engine 140 may be configured to schedule the first broadcasts of the first broadcast queue. Further, the hardware feature-based performance enhancement engine 140 may be configured to schedule the second broadcast of the second broadcast queue after scheduling the first broadcast of the first broadcast queue. In other words, the electronic device 100 prepares a list of broadcasts that need to be delayed after the boot event. This results in improving the electronic device performance.

The second broadcast of the second broadcast queue may be scheduled by recomputing a priority of each receiver for the second broadcast, scheduling the broadcast of the at least one receiver of the at least one predicted application to be launched by the user, scheduling the broadcast of the receivers of at least one application to be launched by the electronic device 100 after scheduling of the at least one receiver of the at least one predicted application to be launched by the user. The second broadcast includes at least one receiver of the at least one predicted application to be launched by the user and the at least one receiver of at least one application to be launched by the electronic device 100.

In various embodiments, the priority for each of the receivers for the second broadcast is recomputed by determining at least one process associated with each of the receivers, determining a plurality of parameters of the at least one process associated with each of the receivers, and recomputing the priority for each of the receivers based on the plurality of parameters of the at least one process associated with each of the receivers.

In various embodiments, the plurality of parameters of the at least one process associated with each of the receivers comprises at least one of an alive duration of the at least one process, a difference between a start time of the at least one process and a boot time of the electronic device 100, a weighting associated with the receivers of at least one application to be launched by the electronic device 100, a weighting associated with the at least one receiver of the at least one predicted application to be launched by the user, a kill time of the at least one process, a category of the at least one process, and a register receiver count of the at least one process. The register receiver count may mean the number of receivers registered to each of the broadcasts.

For example, the broadcast queue may be created based on a priority score. For example, If (Rr−50)>0
1. Create a separate queue
2. Apply Priority Score The priority score may be calculated based on the below equation (6).

$$\text{Priority Score} = \left(0.03T + \frac{60*60}{\Delta t}\right)\left(Sb * \frac{k}{2}\right) \quad (6)$$

where, T represents a process alive duration, $\Delta t$ represents a time difference between a process start time and a system boot time, $S_b$ represents a weighting (start by broadcast=0.2/ start by user=1), k represents a kill time (process killed time−start time), pc represents a process category (System/ Normal), and Rr represents a register receiver count.

Figure 3E:
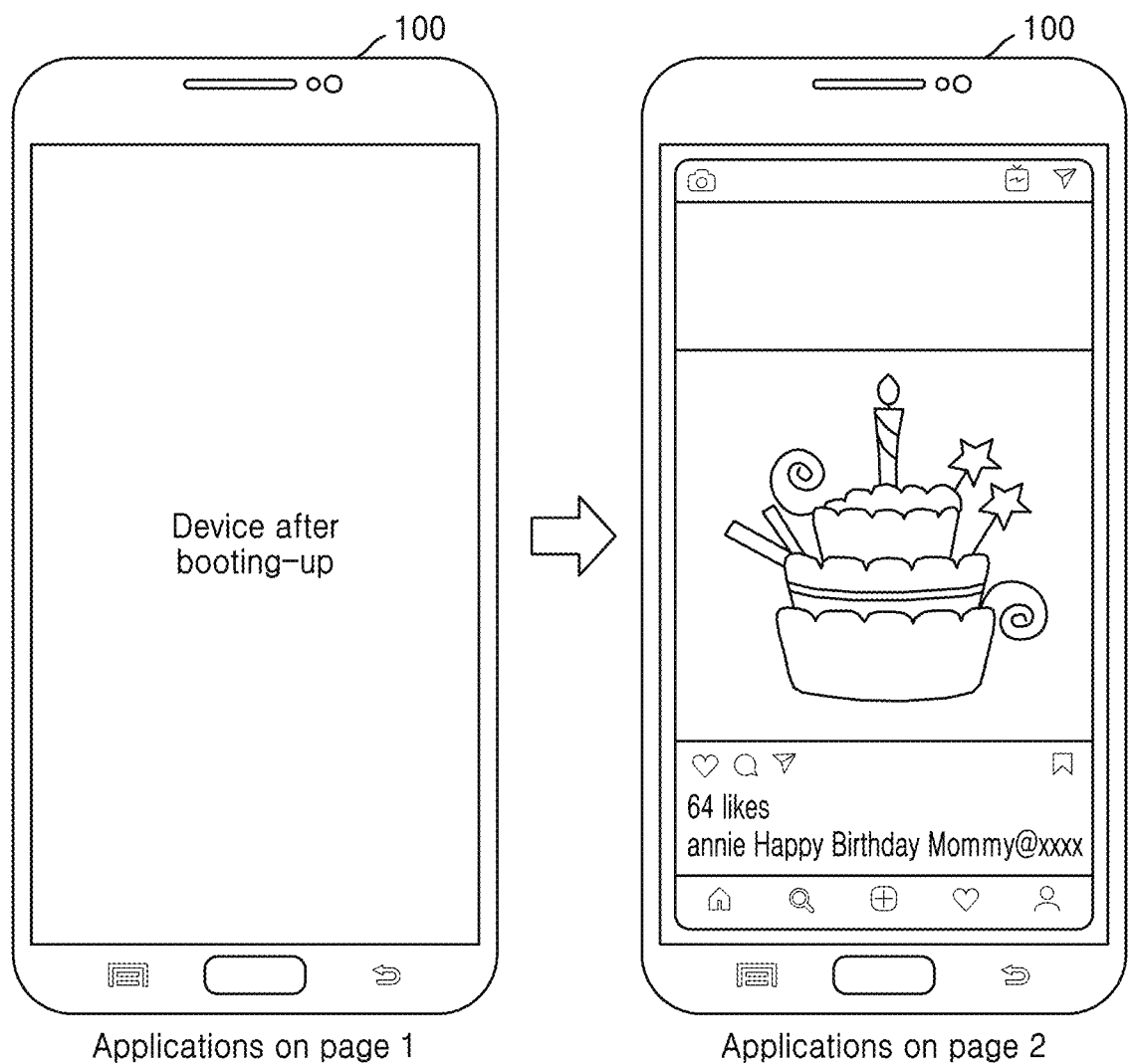
FIG. 3E is an example scenario in which electronic device prioritizes broadcast in the application based on user preference and system learning, while booting the electronic device, according to an embodiment as disclosed herein.

For example, as shown in the FIG. 3E, once the boot event is completed, the electronic device 100 triggers the broadcast for when a boot is finished. Based on the proposed methods, the electronic device 100 creates the separate queue and prioritizes the broadcast based on the user preference and system learning. This results in improving the next application launch.

Based on at least one of the predicted remaining usage time of the battery and the at least one predicted application to be launched by the user, the hardware feature-based performance enhancement engine 140 may be configured to enhance the performance of the electronic device 100.

The processor 110 may be configured to execute instructions stored in the memory 130 and to perform various processes. The communicator 120 may be configured for communicating internally between internal hardware components and with external devices via one or more networks.

The memory 130 stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

Further, at least one of the hardware components may be implemented through an artificial intelligent (AI) model. A function associated with AI may be performed through the non-volatile memory, the volatile memory, and the processor 110. The processor 110 may include one or more processors. The one or more processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or more processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or an AI model of a desired characteristic is made. The learning may be performed in a device itself in which AI according to various embodiments is performed, and may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 1A shows various hardware components of the electronic device 100, it is to be understood that other embodiments are not limited thereon. In other embodiments, the electronic device 100 may include less or more components. Further, the labels or names of the components are used only for illustrative purpose and does not limit the scope of the disclosure. One or more components can be combined together to perform same or substantially similar function to enhance the performance of the electronic device 100.

Figure 1B:
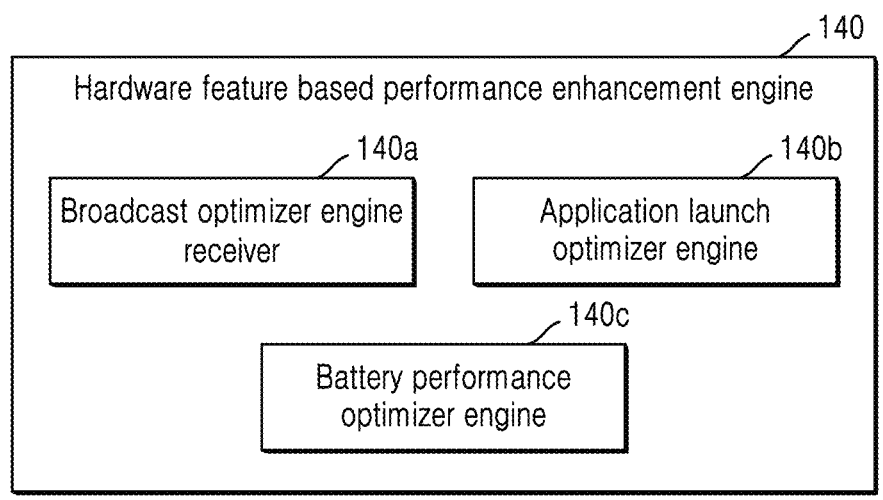
FIG. 1B shows various hardware components of a hardware feature-based performance enhancement engine included in the electronic device, according to an embodiment as disclosed herein.

FIG. 1B shows various hardware components of the hardware feature-based performance enhancement engine 140 included in the electronic device 100, according to an embodiment as disclosed herein. In various embodiments, the hardware feature-based performance enhancement engine 140a may include a broadcast optimizer engine 140a, an application launch optimizer engine 140*b*, and a battery performance optimizer engine 140*c*.

Further, the battery performance optimizer engine 140*c* may be configured to learn the usage pattern of each of the hardware feature of the electronic device 100 over the period of time using the machine learning model 190. In various embodiments, the battery performance optimizer engine 140*c* may be configured to learn the charging pattern of the battery 180 over the period of time using the machine learning model 190. Further, the battery performance optimizer engine 140*c* may be configured to predict the next charging cycle of the battery 180 based on the learned charging pattern of the battery over the period of time.

Based on the usage pattern of each of the hardware feature of the electronic device 100, the battery performance optimizer engine 140*c* may be configured to predict at least one of the remaining usage time of the battery 180 of the electronic device 100.

In various embodiments, the battery performance optimizer engine 140*c* may be configured to predict the next charging cycle of the battery 180. Further, the battery performance optimizer engine 140*c* may be configured to determine whether the remaining usage time of the battery 180 can power the electronic device 100 until the next charge cycle. In response to determining that the remaining usage time of the battery 180 may not power the electronic device 100 until the next charge cycle, the battery performance optimizer engine 140*c* may be configured to optimize the usage of the battery 180 by automatically enabling a power saving mode in the electronic device 100.

In various embodiments, the application launch optimizer engine 140*b* may be configured to predict the at least one application to be launched by the user and determine an amount of memory 130 to be cleared for launching the at least one predicted application based on a plurality of memory parameters.

Further, the application launch optimizer engine 140*b* may be configured to select at least one LRU application from the plurality of currently running applications 150 in the electronic device 100 based on the amount of memory 130 to be cleared for launching the at least one predicted application.

Further, the application launch optimizer engine 140*b* may be configured to clear the at least one selected LRU application before launching the at least one predicted application.

In various embodiments, the application launch optimizer engine 140*b* may be configured to determine whether the at least one selected LRU application is a frequently used application by the user. In response to determining that the at least one selected LRU application is the frequently used application by the user, the application launch optimizer engine 140*b* may be configured to preserve at least one process associated with the at least one selected LRU application. Further, the application launch optimizer engine 140*b* may be configured to clear the at least one selected LRU application after preserving the process associated with the at least one selected LRU application.

In another embodiment, in response to determining that the at least one selected LRU application is not frequently used application by the user, the application launch optimizer engine 140*b* may be configured to clear the at least one selected LRU application and launch the at least one predicted application without preserving the process associated with the at least one selected LRU application.

Further, the application launch optimizer engine 140*b* may be configured to launch the at least one predicted application and enhance the performance of the electronic device 100 based on the at least one predicted application to be launched by the user.

In various embodiments, the broadcast optimizer engine 140*a* may be configured to detect the boot event and generate the plurality of broadcasts to be transmitted to the plurality of broadcast receivers 160 in the electronic device 100. Each of the broadcast receiver is associated with at least one application in the electronic device 100. Further, the broadcast optimizer engine 140*a* may be configured to determine whether a number of receiver exceeds a receiver threshold for each of the broadcasts. Further, the broadcast optimizer engine 140*a* may be configured to create a first broadcast queue comprising a first broadcast having the number of receivers within the receiver threshold and a second broadcast queue comprising a second broadcast having the number of receivers that exceeds the receiver threshold. Further, the broadcast optimizer engine 140*a* may be configured to schedule the first broadcast of the first broadcast queue. Further, the broadcast optimizer engine 140*a* may be configured to schedule the second broadcast of the second broadcast queue after scheduling the first broadcast of the first broadcast queue.

Although the FIG. 1B shows various hardware components of the hardware feature-based performance enhancement engine 140 but it is to be understood that other embodiments are not limited thereon. In other embodiments, the hardware feature-based performance enhancement engine 140 may include less or more components. Further, the labels or names of the components are used only for illustrative purpose and do not limit the scope of the disclosure. One or more components can be combined together to perform the same or substantially similar function(s) to enhance the performance of the electronic device 100.

Figure 2A:
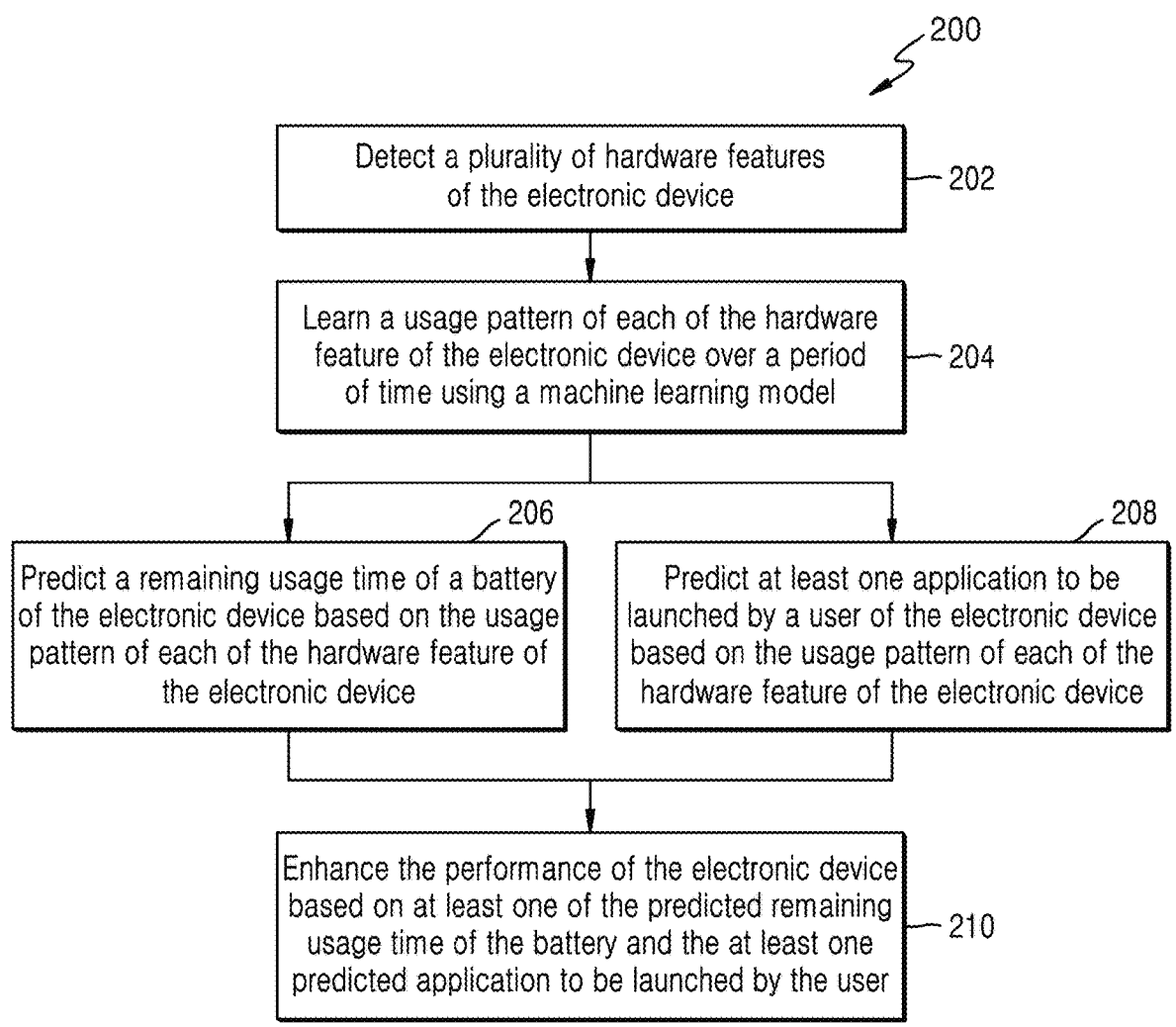
FIG. 2A is a flow chart illustrating a method for enhancing the performance of the electronic device, according to an embodiment as disclosed herein.

FIG. 2A is a flow chart 200 illustrating a method for enhancing the performance of the electronic device 100, according to an embodiment as disclosed herein. The operations 202-210 may be performed by the hardware feature-based performance enhancement engine 140.

At operation 202, the method includes detecting the plurality of hardware features of the electronic device 100. At operation 204, the method includes learning the usage pattern of each of the hardware feature of the electronic device 100 over the period of time using the machine learning model 190. At operation 206, the method includes predicting the remaining usage time of the battery 180 of the electronic device 100 based on the usage pattern of each of the hardware feature of the electronic device 100. At operation 208, the method includes predicting the at least one application to be launched by the user of the electronic device 100 based on the usage pattern of each of the hardware feature of the electronic device 100. At operation 210, the method includes enhancing the performance of the electronic device 100 based on at least one of the predicted remaining usage time of the battery 180 and the at least one predicted application to be launched by the user.

Figure 2B:
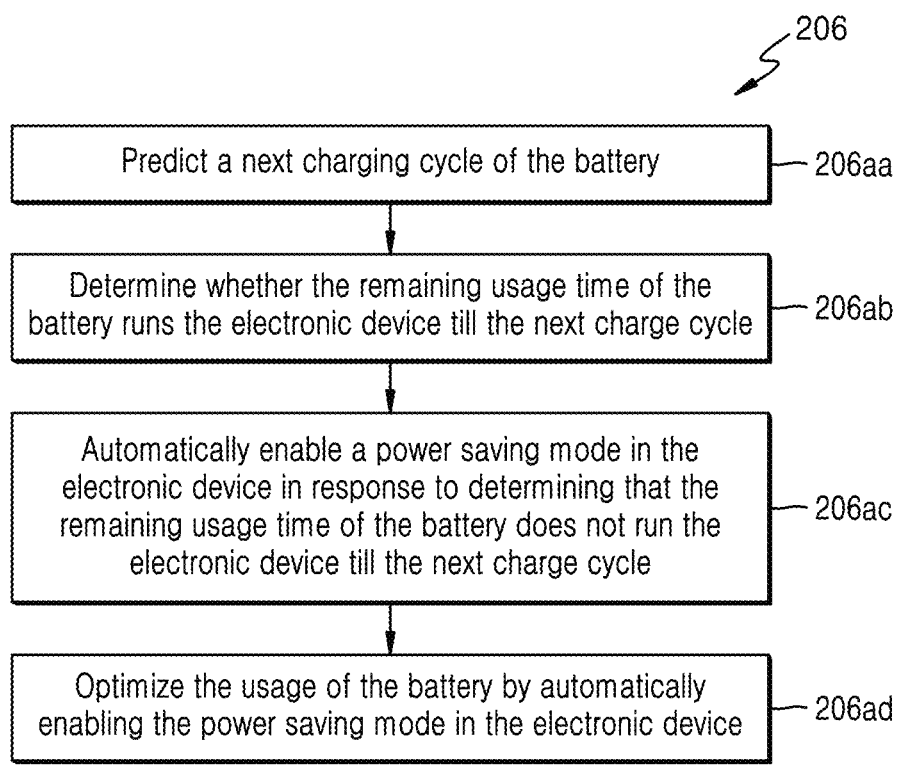
FIG. 2B is a flow chart illustrating various processes for enhancing the performance of the electronic device based on the remaining usage time of a battery, according to an embodiment as disclosed herein.

FIG. 2B is a flow chart 206 illustrating various processes for enhancing the performance of the electronic device 100 based on the remaining usage time of the battery 180, according to an embodiment as disclosed herein. The operations 206*aa*-206*ad* are performed by the hardware feature-based performance enhancement engine 140.

At operation 206*aa*, the method includes predicting the next charging cycle of the battery 180. At operation 206*ab*, the method includes determining whether the remaining usage time of the battery 180 can power the electronic device 100 until the next charge cycle. At operation 206*ac*, the method includes automatically enabling the power saving mode in the electronic device 100 in response to determining that the remaining usage time of the battery 180 may not power the electronic device 100 until the next charge cycle. At operation 206ad, the method includes optimizing the usage of the battery 180 by automatically enabling the power saving mode in the electronic device 100.

Figure 2C:
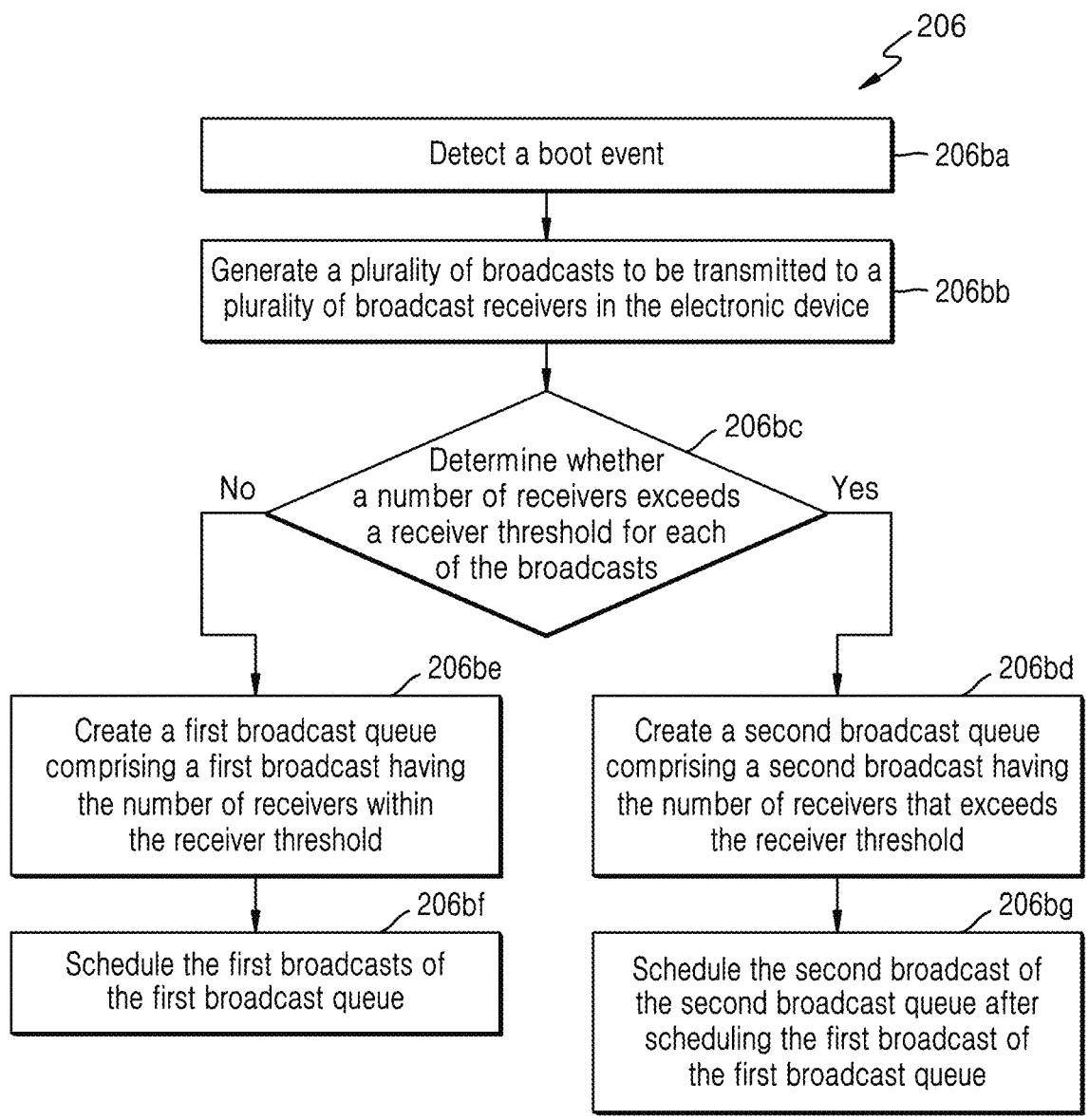
FIG. 2C is a flow chart illustrating various processes for enhancing the performance of the electronic device based on a boot event, according to an embodiment as disclosed herein.

FIG. 2C is another flow chart 206 illustrating various processes for enhancing the performance of the electronic device 100 based on the boot event, according to an embodiment as disclosed herein. The operations 206ba-206bg are performed by the hardware feature-based performance enhancement engine 140.

At operation 206ba, the method includes detect the boot event. At 206ba, the method includes generating the plurality of broadcasts to be transmitted to the plurality of broadcast receivers 160 in the electronic device 100. At operation 206bc, the method includes determining whether the number of receivers exceeds the receiver threshold for each of the broadcasts. If the number of receivers does not exceed the receiver threshold, then, at operation 206be, the method includes creating the first broadcast queue comprising the first broadcast having the number of receivers within the receiver threshold. If the number of receivers exceeds the receiver threshold, then, at operation 206bd, the method includes creating the second broadcast queue comprising the second broadcast having the number of receivers that exceeds the receiver threshold. At operation 206bf, the method includes scheduling the first broadcast of the first broadcast queue. At operation 206bg, the method includes scheduling the second broadcast of the second broadcast queue after scheduling the first broadcast of the first broadcast queue.

Figure 2D:
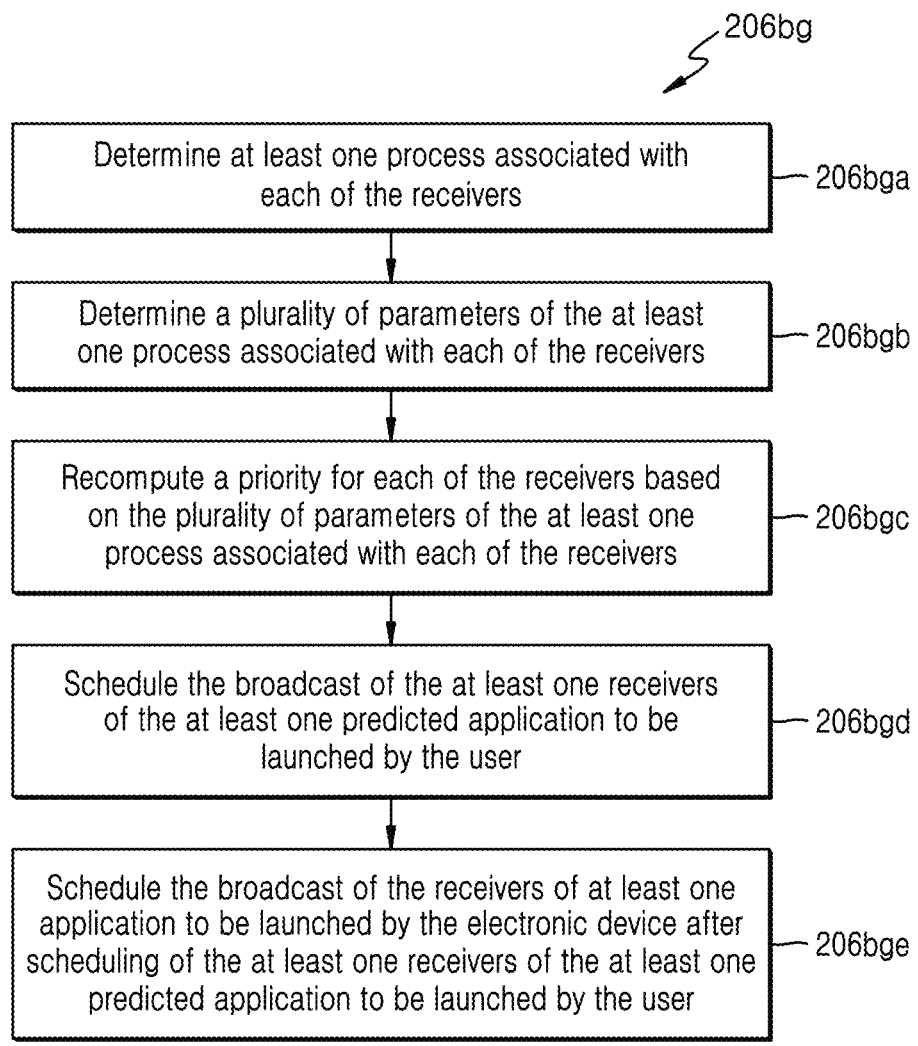
FIG. 2D is a flow chart illustrating various operations for scheduling a second broadcast of a second broadcast queue, according to an embodiment as disclosed herein.

FIG. 2D is a flow chart 206bg illustrating various operations for scheduling the second broadcast of the second broadcast queue, according to an embodiment as disclosed herein. The operations 206bga-206bge are performed by the hardware feature-based performance enhancement engine 140.

At operation 206bga, the method includes determining the at least one process associated with each of the receivers. At operation 206bgb, the method includes determining the plurality of parameters of the at least one process associated with each of the receivers. At operation 206bgc, the method includes recomputing the priority for each of the receivers based on the plurality of parameters for the at least one process associated with each of the receivers. At operation 206bgd, the method includes scheduling the broadcast of the at least one receiver for the at least one predicted application to be launched by the user. At operation 206bge, the method includes scheduling the broadcast of the receivers of at least one application to be launched by the electronic device 100 after scheduling the at least one receiver for the at least one predicted application to be launched by the user.

Figure 2E:
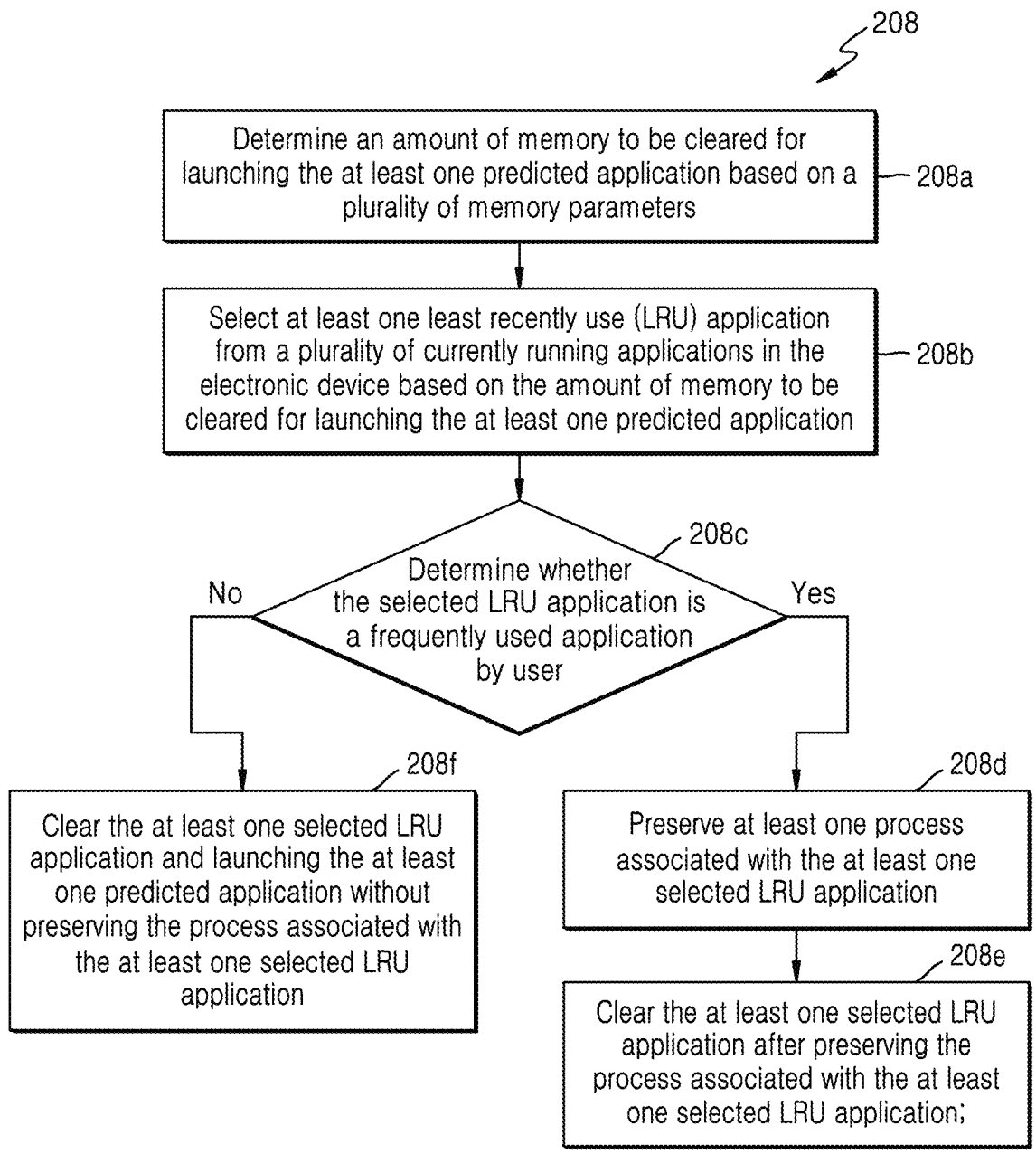
FIG. 2E is a flow chart illustrating a method for enhancing the performance of the electronic device based on the at least one predicted application to be launched by the user, according to an embodiment as disclosed herein.

FIG. 2E is a flow chart 208 illustrating a method for enhancing the performance of the electronic device 100 based on the at least one predicted application to be launched by the user, according to an embodiment as disclosed herein. The operations 208a-208f are performed by the hardware feature-based performance enhancement engine 140.

At operation 208a, the method includes determining an amount of memory 130 to be cleared for launching the at least one predicted application based on the plurality of memory parameters. At operation 208b, the method includes selecting the at least one LRU application from the plurality of currently running applications 150 in the electronic device 100 based on the amount of memory 130 to be cleared for launching the at least one predicted application.

At operation 208c, the method includes determining whether the selected LRU application is a frequently used application by the user. If the selected LRU application is a frequently used application by the user, then, at operation 208d, the method includes preserving at least one process associated with the at least one selected LRU application and clearing the at least one selected LRU application after preserving the process associated with the at least one selected LRU application at operation 208e. If the selected LRU application is not the frequently used application by the user, then, at operation 208f, the method includes clearing the at least one selected LRU application and launching the at least one predicted application without preserving the process associated with the at least one selected LRU application.

The various actions, acts, blocks, steps, or the like in the flow charts 200, 206, 206bg and 208 may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented using at least one software program running on at least one hardware device and performing network management functions to control the elements.

Embodiments of the disclosure may be implemented as computer-executable code stored in a computer-readable recording medium. Examples of the computer-readable recording medium include all recording media such as a magnetic medium, an optical medium, read-only memory (ROM), and random-access memory (RAM). The computer-readable recording medium may be provided as a non-transitory storage medium. Here, 'non-transitory' means that the storage medium does not include a signal and is tangible, but does not distinguish whether data is stored semi-permanently or temporarily on the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be stored and distributed in a computer-readable recording medium, or may be distributed (e.g., downloaded or uploaded) online via an application store (e.g., Play Store™) or between two user devices (e.g., smartphones) directly. When distributed online, at least a part of the computer program product (e.g., a downloadable application) may be temporarily generated or at least temporarily stored in a computer-readable recording medium such as a memory of a manufacturer's server, a server of the application store, or a relay server.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for enhancing a performance of an electronic device, comprising:
   detecting, by the electronic device, a plurality of hardware features of the electronic device;

learning, by the electronic device, a usage pattern of each of the hardware features of the electronic device over a period of time using a machine learning model;

predicting, by the electronic device, at least one of a remaining usage time of a battery of the electronic device and at least one application to be launched by a user of the electronic device based on the usage pattern of each of the hardware features of the electronic device; and enhancing, by the electronic device, the performance of the electronic device based on at least one of the predicted remaining usage time of the battery and the at least one predicted application to be launched by the user, wherein enhancing the performance of the electronic device based on the at least one predicted application to be launched by the user comprises:
  determining, by the electronic device, an amount of memory to be cleared for launching the at least one predicted application based on a plurality of memory parameters;
  selecting, by the electronic device, at least one least recently used (LRU) application from a plurality of currently running applications in the electronic device based on the amount of memory to be cleared for launching the at least one predicted application;
  clearing, by the electronic device, the at least one selected LRU application before launching the at least one predicted application; and
  launching, by the electronic device, the at least one predicted application.

2. The method of claim 1, wherein the plurality of hardware features comprises at least one of a memory, a network, a display, a speaker, a Global Positioning System (GPS), a Wireless Fidelity (Wi-Fi), a Bluetooth, a camera, a microphone, and a processor.

3. The method of claim 1, wherein enhancing the performance of the electronic device based on the remaining usage time of the battery comprises:
  predicting, by the electronic device; and
  optimizing, by the electronic device, a usage of the battery by automatically enabling at least one power saving mode in the electronic device based on the remaining usage time of the battery and a next charge cycle.

4. The method of claim 3, wherein optimizing the usage of the battery by automatically enabling the at least one power saving mode in the electronic device based on the remaining usage time of the battery and the next charge cycle comprises:
  determining, by the electronic device, whether the remaining usage time of the battery can power the electronic device until the next charge cycle; and
  optimizing, by the electronic device, the usage of the battery by automatically enabling a power saving mode in the electronic device in response to determining that the remaining usage time of the battery may not power the electronic device until the next charge cycle,
  wherein the power saving mode enables the remaining usage time of the battery to power the electronic device until the next charge cycle.

5. The method of claim 3, wherein predicting the next charging cycle of the battery comprises:
  learning, by the electronic device, a charging pattern of the battery over the period of time using the machine learning model; and
  predicting, by the electronic device, the next charging cycle of the battery based on the learned charging pattern of the battery over the period of time.

6. The method of claim 1, wherein the at least one LRU application comprises a least priority in compared to other applications currently running in the electronic device.

7. The method of claim 1, wherein clearing the at least one selected LRU application before launching the at least one predicted application comprises:
  determining, by the electronic device, whether the at least one selected LRU application is a frequently used application by the user;
  preserving at least one process associated with the at least one selected LRU application in response to determining that the at least one selected LRU application is the frequently used application by the user, and clearing the at least one selected LRU application after preserving the process associated with the at least one selected LRU application; and
  clearing the at least one selected LRU application without preserving the process associated with the at least one selected LRU application in response to determining that the at least one selected LRU application is not the frequently used application by the user.

8. The method of claim 1, wherein the plurality of memory parameters comprises:
  at least one of a number of free slots of a memory,
  a cumulative launch time of the at least one predicted application to be launched,
  the amount of memory to be cleared for launching the at least one predicted application,
  a current load of the electronic device, and
  an average launch time of the at least one predicted application to be launched for at least one free slot of the memory.

9. The method of claim 7, wherein the determining whether the at least one selected LRU application is the frequently used application by the user is based on at least one of an alive duration of the at least one selected LRU application per hour, a duration of the at least one selected LRU application not visible on a display, a time difference between life cycles of the at least one selected LRU application, a time difference between pause event of the at least one selected LRU application and a resume event of the at least one selected LRU application, a number of time the at least one selected LRU application cleared and created in a specific duration, and a mean time of at least one selected LRU application life cycle creation.

10. The method of claim 1, wherein enhancing the performance of the electronic device based on the at least one predicted application to be launched by the user comprises:
  detecting, by the electronic device, a boot event;
  generating, by the electronic device, a plurality of broadcasts to be transmitted to a plurality of broadcast receivers in the electronic device, wherein each of the broadcast receiver is associated with at least one application in the electronic device;
  for each of the broadcasts, determining, by the electronic device, that a number of receivers exceeds a receiver threshold;
  creating, by the electronic device, a first broadcast queue comprising a first broadcast having the number of receivers within the receiver threshold and a second broadcast queue comprising a second broadcast having the number of receivers that exceeds the receiver threshold;

scheduling, by the electronic device, the first broadcasts of the first broadcast queue; and scheduling, by the electronic device, the second broadcast of the second broadcast queue after scheduling the first broadcast of the first broadcast queue.

11. The method of claim 10, wherein scheduling of the second broadcast of the second broadcast queue comprises:

recomputing, by the electronic device, a priority of each receiver for the second broadcast, wherein the second broadcast comprises at least one receiver for the at least one predicted application to be launched by the user and the at least one receiver for at least one application to be launched by the electronic device;

scheduling, by the electronic device, the second broadcast of the at least one receiver for the at least one predicted application to be launched by the user; and scheduling, by the electronic device, the second broadcast of the at least one receiver for at least one application to be launched by the electronic device after the scheduling of the at least one receiver for the at least one predicted application to be launched by the user.

12. The method of the claim 11, wherein recomputing the priority for each of the receivers of the second broadcast comprises:

determining, by the electronic device, at least one process associated with each of the receivers;

determining, by the electronic device, a plurality of parameters of the at least one process associated with each of the receivers; and recomputing, by the electronic device, the priority for each of the receivers based on the plurality of parameters of the at least one process associated with each of the receivers.

13. The method of claim 12, wherein the plurality of parameters of the at least one process associated with each of the receivers comprises at least one of an alive duration of the at least one process, a difference between a start time of the at least one process and a boot time of the electronic device, a weighting associated with the receivers of at least one application to be launched by the electronic device, a weighting associated with the at least one receiver of the at least one predicted application to be launched by the user, a kill time of the at least one process, a category of the at least one process, and a register receiver count of the at least one process.

14. An electronic device for enhancing a performance of the electronic device, comprising:

a memory;

a processor coupled with the memory; and a hardware feature-based performance enhancement engine, coupled to the memory and the processor, configured to:

detect a plurality of hardware features of the electronic device;

learn a usage pattern of each of the hardware features of the electronic device over a period of time using a machine learning model;

predict at least one of a remaining usage time of a battery of the electronic device and at least one application to be launched by a user of the electronic device based on the usage pattern of each of the hardware features of the electronic device; and enhance the performance of the electronic device based on the at least one of the predicted remaining usage time of the battery and the at least one predicted application to be launched by the user, wherein the processor is further configured to enhance the performance of the electronic device based on the at least one predicted application to be launched by the user by:

determine an amount of memory to be cleared for launching the at least one application based on a plurality of memory parameters;

select at least one least recently used (LRU) application from a plurality of currently running applications in the electronic device based on the amount of memory to be cleared for launching the at least one predicted application;

clear the at least one selected LRU application before launching the at least one predicted application; and launch the at least one predicted application.

15. The electronic device of claim 14, wherein the processor is further configured to enhance the performance of the electronic device based on the remaining usage time of the battery by:

predicting a next charging cycle of the battery;

determining that the remaining usage time of the battery can power the electronic device until the next charge cycle; and optimizing a usage of the battery by automatically enabling a power saving mode in the electronic device in response to determining that the remaining usage time of the battery may not power the electronic device until the next charge cycle, wherein the power saving mode enables the remaining usage time of the battery to power the electronic device until the next charge cycle.

16. The electronic device of claim 15, wherein the processor is further configured to predict the next charging cycle of the battery by:

learning a charging pattern of the battery over the period of time using the machine learning model; and predicting the next charging cycle of the battery based on the learned charging pattern of the battery over the period of time.

17. The electronic device of claim 14, wherein, to clear the at least one selected LRU application before launching the at least one predicted application, the processor is further configured to:

determine whether the at least one selected LRU application is a frequently used application by the user;

preserve at least one process associated with the at least one selected LRU application in response to determining that the at least one selected LRU application is the frequently used application by the user, and clearing the at least one selected LRU application after preserving the process associated with the at least one selected LRU application; and clear the at least one selected LRU application without preserving the process associated with the at least one selected LRU application in response to determining that the at least one selected LRU application is not frequently used application by the user.

18. A non-transitory computer-readable recording medium having recorded thereon a computer program that is executable by at least one processor to perform:

detecting a plurality of hardware features of an electronic device;

learning a usage pattern of each of the hardware features of the electronic device over a period of time using a machine learning model;

predicting at least one of a remaining usage time of a battery of the electronic device and at least one application to be launched by a user of the electronic device based on the usage pattern of each of the hardware features of the electronic device; and enhancing the performance of the electronic device based on at least one of the predicted remaining usage time of the battery and the at least one predicted application to be launched by the user, wherein enhancing the performance of the electronic device based on the at least one predicted application to be launched by the user comprises:

determining, by the electronic device, an amount of memory to be cleared for launching the at least one predicted application based on a plurality of memory parameters;

selecting, by the electronic device, at least one least recently used (LRU) application from a plurality of currently running applications in the electronic device based on the amount of memory to be cleared for launching the at least one predicted application;

clearing, by the electronic device, the at least one selected LRU application before launching the at least one predicted application; and launching, by the electronic device, the at least one predicted application.

* * * * *